(12) United States Patent
Cox et al.

(10) Patent No.: US 7,536,372 B2
(45) Date of Patent: May 19, 2009

(54) MODELESS USER INTERFACE INCORPORATING AUTOMATIC UPDATES FOR DEVELOPING AND USING BAYESIAN BELIEF NETWORKS

(75) Inventors: Zachary T. Cox, Barrie (CA); Jonathan D. Pfautz, Jamaica Plain, MA (US)

(73) Assignee: Charles River Analytics, Inc., Cambridge, MA (US)

( * ) Notice: Subject to any disclaimer, the term of this patent is extended or adjusted under 35 U.S.C. 154(b) by 36 days.

(21) Appl. No.: 11/183,397

(22) Filed: Jul. 18, 2005

(65) Prior Publication Data

US 2006/0020568 A1 Jan. 26, 2006

Related U.S. Application Data

(60) Provisional application No. 60/591,269, filed on Jul. 26, 2004.

(51) Int. Cl.
*G06F 9/44* (2006.01)
*G06N 7/02* (2006.01)
*G06N 7/06* (2006.01)

(52) U.S. Cl. ....................................................... 706/52
(58) Field of Classification Search .................... 706/52
See application file for complete search history.

(56) References Cited

U.S. PATENT DOCUMENTS

| | | | | |
|---|---|---|---|---|
| 5,704,017 A * | 12/1997 | Heckerman et al. | ............ | 706/12 |
| 6,208,955 B1 * | 3/2001 | Provan et al. | ................. | 703/20 |
| 6,415,276 B1 * | 7/2002 | Heger et al. | .................... | 706/52 |
| 6,529,895 B2 * | 3/2003 | Heckerman | .................... | 707/2 |
| 6,931,384 B1 * | 8/2005 | Horvitz et al. | ................. | 706/45 |
| 6,989,742 B2 * | 1/2006 | Ueno et al. | ................... | 340/511 |
| 7,007,001 B2 * | 2/2006 | Oliver et al. | ................... | 706/21 |
| 7,072,795 B2 * | 7/2006 | Haft et al. | .................... | 702/181 |
| 7,103,874 B2 * | 9/2006 | McCollum et al. | ........... | 717/121 |
| 7,328,200 B2 * | 2/2008 | Przytula | ...................... | 706/52 |
| 7,328,201 B2 * | 2/2008 | D'Ambrosio | ................ | 706/52 |
| 7,363,308 B2 * | 4/2008 | Dillon et al. | ................. | 707/101 |
| 7,383,148 B2 * | 6/2008 | Ahmed | ....................... | 702/127 |

(Continued)

OTHER PUBLICATIONS

Semantic-Driven Model Composition for Accurate Anomaly Diagnosis Ghanbari, S.; Amza, C.; Autonomic Computing, 2008. ICAC '08. International Conference on Jun. 2-6, 2008 pp. 35-44 Digital Object Identifier 10.1109/ICAC.2008.33.*

(Continued)

*Primary Examiner*—Michael B Holmes
(74) *Attorney, Agent, or Firm*—McDermott Will & Emery LLP

(57) ABSTRACT

An application for developing and using a model of a Bayesian Network to compute beliefs. The application provides an interface through which a user may specify the construction of the Bayseian Network, such as by specifying nodes in the network, parameters associated with the nodes, conditional probability distributions associated with the parameters or evidence that a parameter has a particular value. The application builds an inference engine based on user input specifying the construction of the Bayesian Network and uses it to compute beliefs. The application provides a user interface through which a user may specify the construction of the Bayesian Network and automatically updates an output reflecting beliefs. The input and output information may be available to the user simultaneously without switching operating modes of the application.

30 Claims, 7 Drawing Sheets

U.S. PATENT DOCUMENTS 7,424,464 B2 * 9/2008 Oliver et al. .................. 706/21

OTHER PUBLICATIONS

Modelling e-commerce systems' quality with belief networks Stefani, A.; Xenos, M.; Stavrinoudis, D.; Virtual Environments, Human-Computer Interfaces and Measurement Systems, 2003. VECIMS '03. 2003 IEEE International Symposium on Jul. 27-29, 2003 pp. 13-18.*

A Design of the Mental Model of a Cognitive Robot Kyung-Sook Park; Dong-Soo Kwon; Mignon Park; Robot and Human interactive Communication, 2007. RO-MAN 2007. The 16th IEEE International Symposium on Aug. 26-29, 2007 pp. 905-911 Digital Object Identifier 10.1109/ROMAN.2007.4415213.*

Hierarchical Bayesian methods for recognition and extraction of 3-D shape features from CAD solid models Marefat, M.M.; Qiang Ji; Systems, Man and Cybernetics, Part A, IEEE Transactions on vol. 27, Issue 6, Nov. 1997 pp. 705-727 Digital Object Identifier 10.1109/3468.634635.*

Application of data mining techniques as a complement to natural inflow uni-variable stochastic forecasting—a case study : the Iguacu River Basin Cataldi, M.; Achao, Cd.C.L.; Guilhon, L.G.F.; Hybrid Intelligent Systems, 2005. HIS '05. Fifth International Conference on Nov. 6-9, 2005 p. 6 pp. Digital Object Identifier 10.1109/ICHIS.2005.24.*

Student modeling with timed assessment information Hairong Liu; Hongchi Shi; Yi Shang; Su-Shing Chen; Information Technology: Research and Education, 2004. ITRE 2004. 2nd International Conference on Jun. 28-Jul. 1, 2004 pp. 121-125 Digital Object Identifier 10.1109/ITRE.2004.1393659.*

Classification of pathology data using a probabilistic (Bayesian) model Robin, H.; Eberhardt, J.S., III; Muller, W.D.; Clark, R.; Kam, J.; Systems Engineering, 2005. ICSEng 2005. 18th International Conference on Aug. 16-18, 2005 pp. 286-291 Digital Object Identifier 10.1109/ICSENG.2005.22.*

A method for evaluating elicitation schemes for probabilistic models Wang, H.; Dash, D.; Druzdzel, M.J.; Systems, Man, and Cybernetics, Part B, IEEE Transactions on vol. 32, Issue 1, Feb. 2002 pp. 38-43 Digital Object Identifier 10.1109/3477.979958.*

A hierarchical model for estimating the early reliability of complex systems Johnson, V.E.; Moosman, A.; Cotter, P.; Reliability, IEEE Transactions on vol. 54, Issue 2, Jun. 2005 pp. 224-231 Digital Object Identifier 10.1109/TR.2005.847262.*

Target identification based on the transferable belief model interpretation of dempster-shafer model Delmotte, F.; Smets, P.; Systems, Man and Cybernetics, Part A, IEEE Transactions on vol. 34, Issue 4, Jul. 2004 pp. 457-471 Digital Object Identifier 10.1109/TSMCA.2004.826266.*

Assessing sensor reliability for multisensor data fusion within the transferable belief model Elouedi, Z.; Mellouli, K.; Smets, P.; Systems, Man, and Cybernetics, Part B, IEEE Transactions on vol. 34, Issue 1, Feb. 2004 pp. 782-787 Digital Object Identifier 10.1109/TSMCB.2003.817056.*

Huang et al, "Inference in Belief Networks: A Procedural Guide," International Journal of Approximate Reasoning 1994; pp. 1-45.

Darwiche, "A Differential Approach to Inference in Bayesian Networks," University of California, pp. 1-20.

Cobb, et al., "Inference in Hybrid Bayesian Networks with Mixtures of Truncated Exponentials," University of Kansas School of Business Working Paper No. 294, Oct. 22, 2004, pp. 1-35.

Gamma, et al., Design Patterns, "Elements of Reusable Object-Oriented Software," Observer, pp. 293-303.

Hugin 6.5 Product Screen Shots, Figs. 1 and 2, Captured Sep. 23, 2005.

Netica 1.12 Product Screen Shots, Figs. 1 and 2, Captured Sep. 23, 2005.

BayesiaLab Product Screen Shots, Figs. 1 and 2, Captured Sep. 23, 2005.

AgenaRisk 3.14.3 Product Screen Shots, Fig. 1, Captured Sep. 23, 2005.

Genie 2.0 Product Screen Shots, Fig. 1, Captured Sep. 23, 2005.

Samlam 2.2.1 Product Screen Shots, Fig. 1, Captured Sep. 23, 2005.

* cited by examiner

MODELESS USER INTERFACE INCORPORATING AUTOMATIC UPDATES FOR DEVELOPING AND USING BAYESIAN BELIEF NETWORKS

RELATED APPLICATIONS

This application claims priority under 35 U.S.C. § 119(e) to U.S. Provisional Application Ser. No. 60/591,269, entitled "MODELESS USER INTERFACE INCORPORATING AUTOMATIC UPDATES FOR DEVELOPING AND USING BAYESIAN BELIEF NETWORKS," filed on Jul. 26, 2004, which is herein incorporated by reference in its entirety.

BACKGROUND OF INVENTION

1. Field of Invention

This invention relates generally to data modeling and analysis and more particularly to a computerized system for developing and using Bayesian belief networks, such as in data modeling and analysis.

2. Discussion of Related Art

Computerized data models are important in solving real-world problems because these models can predict future data and/or explain past data, especially for large and complex data sets where humans are unable to effectively understand the data. One data modeling technique is probabilistic modeling. Probabilistic modeling provides mathematically rigorous methods for handling uncertainty when modeling a problem domain and has an extremely wide range of applications, including medical diagnosis, bioinformatics, computer vision, signal processing, control systems, cognitive science, and financial modeling.

One technique with which probabilistic data may be modeled is Bayesian Networks (BN), also known as belief networks, Bayesian belief networks, probabilistic networks, or directed graphical models. Bayesian Networks are described in the literature such as Russell, P. & Norvig, P. (2003), *Artificial Intelligence: A Modern Approach*, (Second Edition) Upper Saddle River, N.J.: Prentice Hall; Jensen, F. V. (2001) *Bayesian Networks and Decision Graphs*, New York: Spring Verlag; and Pearl, J. (1988), *Probabilistic Reasoning in Intelligent Systems: Networks of plausible Inference*, San Mateo, Calif.: Morgan Kaufmann; which are hereby incorporated by reference. A BN consists of nodes connected by directed edges. Each node represents a particular random variable having some number of states. Both discrete nodes, which have a finite number of states, and continuous nodes, which have an infinite number of states, can exist in a BN. Each edge is directed from a parent node to a child node and represents the causal influence of the parent node on the child node.

Each node in a BN has a conditional probability distribution (CPD) associated with it that describes the causal influences of its parents. A CPD includes the probability of the node's variable being in a particular state as a function of the states of its parent nodes. There are no restrictions on the types of conditional probability distributions used and each node in the BN can use a different CPD. The CPD for node Child that has n parent nodes $Parent_1, Parent_2, \ldots, Parent_n$ is represented by $P(Child|Parent_1, Parent_2, \ldots, Parent_n)$, which specifies the conditional probability distribution for Child given the values of all the parent variables.

Bayesian networks are used to compute the probabilities that certain events will occur given the likelihood that certain other events have already occurred. These probabilities are called beliefs and are stated mathematically as $P(X|e)$, or the probability of X given some evidence e. The beliefs for the nodes in the BN are calculated using the CPDs and the evidence.

The BN may be represented by data stored in a computer allowing automated data processing to compute beliefs. An inference engine (IE) is typically used to compute beliefs. Many different IE's are described in the literature, including Darwiche, A. (2003), A Differential Approach to Inference in Bayesian Networks, *Journal of the ACM,* 50(3), 280-305; Jensen, F. V. (2001), *Bayesian Networks and Decision Graphs*, New York: Spring Verlag; Dechter, R. (1999), Bucket Elimination: A Unifying Framework for Reasoning, *Artificial Intellegence,* 11341-85; Madsen, A. L. & Jensen, F. V. (1999), Lazy Propagation: A Junction Tree Algorithm based on Lazy Evaluation, *Artificial Intellegence,* 113(1-2), 203-245; Huang, C. & Darwiche, A. (1996), Inference in Belief Networks: A Procedural Guide, *International Journal of Approximate Reasoning,* 15225-263; Zhang, N. L. & Poole, D. (1994), A Simple Approach to Bayesian Network Computations, *Proceedings of the 10th Canadian Conference on Artificial Intelligence*, (pp. 171-178), Banff, Alberta; Shacter, R. D., D'Amrosio, B., & Del Favero, B. A. (1990), Symbolic Probabilistic Inference in Belief Networks, *Proceedings of the 8th Nat'l Conference on Artificial Intelligence (AAAI-90)*, (pp. 126-131), Boston: MIT Press; Shafer, G. R. & Shenoy, P. P. (1990), Probability Propagation, *Ann. Math. Artificial Intelligence;* 2327-352; Lauritzen, S. L. & Spiegelhalter, D. J. (1988), Local Computation with Probabilities on Graphical Structures and Their Applications to Expert Systems, *Journal of the Royal Statistical Society B,* 50(2), and the above-mentioned Jensen, 2001 article and the Pearl, 1988 article, referenced above, all of which are hereby incorporated by reference. Often, an IE is built from a particular BN and can then be used to compute beliefs using any evidence. In other words, the CPDs and evidence are inputs to the IE and beliefs are the outputs. But only the evidence can change at run-time; if the CPD of any node in the BN changes in any way, the IE must be built again before beliefs can be calculated again.

The evidence e specifies the events that have already occurred. More specifically, the evidence provides a real number between zero and one (inclusive) for each state of each node that represents an event that has already occurred. These numbers represent the independent likelihood of the states for each observed node. So, in a typical BN, observations are obtained for some variables in the BN, and then beliefs are calculated for other nodes. Either a human operator or a computer then uses these beliefs to make decisions.

The process of receiving user input and computing beliefs is often performed by a software application program that has a user interface through which a user can provide inputs or obtain outputs. In the terminology of user interface development for computer software applications, a mode is defined as a set of functionality and interactions available to the user. In an application with only a single mode (also called modeless), any desired functionality and interactions can be available to the user. In an application with multiple modes (also called modal), the application is in one of the modes at any given time and there are certain functionality and interactions from the other modes that are not available to the user. To obtain access to the unavailable functionality and interactions, the user must explicitly switch the application into the appropriate mode using a mode-switching interaction.

User interface modes can be manifested in many different ways in a software application. Two common realizations of modes, especially related to Bayesian network development software, are modal dialogs and application modes. The first type, modal dialogs, are windows that are displayed over the main application window and accept input from the user. While the modal dialog is open, the user is prevented from interacting with any part of the application except for the modal dialog. The only way for the user to interact with any other part of the application is to close the modal dialog. Modal dialogs commonly contain "OK", "Cancel", and/or "Close" buttons that can be used to close the modal dialog and allow the user to once again interact with other windows in the application. (Note: other button names representing the action provided by the modal dialog can also close the dialog window, e.g., "Print", "Update", "Apply", "Next" or "Finish").

The second type of modes, application modes, are not as readily apparent to the user as modal dialogs. The application is initially in one mode that provides the user with some set of functionality and information displays, and some specific interaction switches the application to another mode with a different set of functionality and displays. This mode-switching interaction can be the click of a button, selection of a different tab, etc. To gain access to unavailable functionality or displays the user must explicitly perform the mode-switching interaction to switch the application to the desired mode and will lose access to the functionality and displays of the previous mode.

The major drawbacks of modal software applications are the disruption and delay caused by mode-switching interactions and the lack of availability of needed functionality and interactions not designed to be available across application modes. Users of poorly designed modal applications have complained that having to explicitly switch to a different mode is annoying because it requires focusing on the mode-switching interaction instead of on their main task and can require any number of tasks on the user's part to switch the mode. The ability of the users to use the software application is also impeded by not having access to desired functionality or interactions when needed, and subsequently forcing the user to move focus to identifying and selecting the required mode.

All current software applications for developing Bayesian networks are modal in some way. The most common is the application mode type, where two separate modes are provided, one for modifying the BN and one for using the BN (i.e., viewing beliefs as a function of a priori information and current evidence and/or providing additional evidence). In the first mode, functionality and interactions for modifying the BN are available to the user but functionality and interactions for using the BN are unavailable. Likewise, in the second mode, functionality and interactions for using the BN are available to the user but functionality and interactions for modifying the BN are unavailable. Typically, the user must explicitly click a button to switch modes.

More recent BN development software applications have improved with respect to this problem, but all current applications still have modal user interfaces. Instead of relying on two separate modes for modifying and using the BN, they provide much of the functionality and interactions in modal dialogs. In one application, interactions for adding and removing nodes and edges as well as posting and retracting evidence are always available in the main application window, but the user must open a modal dialog to add, remove, reorder, or rename the states of a node or to modify the CPD of a node. While the modal dialog is open the user is prevented from performing the interactions in the rest of the application. The user must explicitly close the modal dialog to receive access to these interactions again. Once the modal dialog is closed the user is again prevented from performing the interactions available in the modal dialog.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

result in updated displays and updated beliefs.

SUMMARY OF INVENTION

Figure 1:
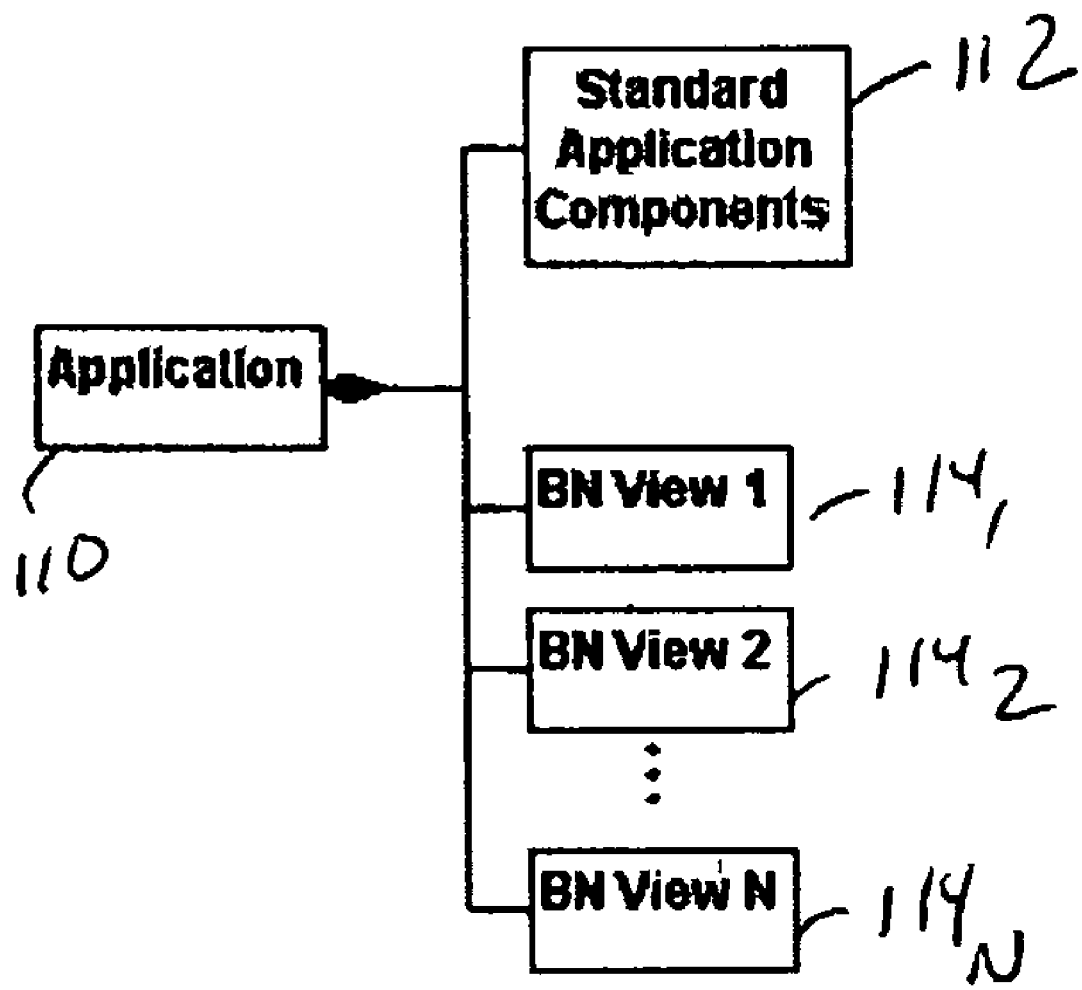
FIG. 1 is a block diagram of a BN development application according to one embodiment of the invention.

In one aspect, the invention relates to a method of processing data for a belief network. The method includes receiving a plurality of inputs representing evidence and information indicative of a structure of a belief network. At least one output representative of at least one belief based on the plurality of inputs is provided. The output representative of at least one belief is automatically updated in response to at least one of the plurality of inputs having a value representative of a change to the evidence or the information indicative of the structure of the belief network.

In another aspect, the invention relates to a software product comprising a plurality of computer-executable modules. The modules include a module for receiving information representative of a BN. A module detects received information representative of a modification of the BN. A module builds an inference engine for computing beliefs based on the BN in response to the detected modification of the BN.

In another aspect, the invention relates to a computer system having a graphical user interface including a display and a user input device. Information is displayed to a user and inputs are receiving from the user by simultaneously displaying in a first viewing area information reflecting a construction of a belief network and displaying in a second viewing area information reflecting a belief derived from a computation using the belief network. User input specifying a modification of the construction of the belief network is received based on an interaction with the first viewing area. Information reflecting a modified belief is automatically derived from a computation using the belief network as modified according to the user input. Information reflecting the modified belief is automatically displaying in the second viewing area.

DETAILED DESCRIPTION

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives.

We have recognized that explicitly switching modes disrupts a users' task flow because users must shift focus from modifying or using the BN to clicking on the mode-switching button and then adjust to the different appearance of the windows in the other mode. During development of a BN the user generally iterates many times between modifying the BN and using the BN to ensure that it correctly models the problem domain. As a result, the constant mode switching is tedious and impedes the ability of the user to effectively interact with and develop the BN.

Because current BN development applications are modal, it is impossible for them to perform automatic belief updating whenever the user makes any of the modifications listed above. Because there is functionality unavailable to the user depending on the current mode of the application, the user cannot perform certain modifications to the BN.

For example, in prior art BN development applications, the user cannot view the effects of the modification on the beliefs without performing a mode-switching interaction. In true automatic belief updating, described in this document, the user can perform modification to the BN and view the updated beliefs without having to perform any additional actions.

As will be described in greater detail below, a BN development application solves the above and other problems related to the lack of automatic updating of beliefs in BN software applications, thereby advancing the state of the useful arts by providing an interface for the user to modify the BN in a single mode and immediately, without further action on the user's part, to view the effect of the modifications on the beliefs. Using such an improved interface simplifies the interactions required by the user to create, interact with, and use BNs.

Because the application is modeless, the user can focus on creating the content of the model instead of focusing on switching modes or opening and closing modal dialogs. In certain embodiments, all modifications to the BN can be made directly in the main application window at any time. In these embodiments, no modifications are prevented because of separate modes.

Because the BN development application may update beliefs automatically, the user can see how modifications affect the beliefs without the delay associated with switching modes. Viewing the effects of modifications on beliefs immediately, without any further action on the part of the user, helps the user produce better models and identify problems in a model more quickly. The user can disable automatic belief updating for any specific modification (e.g., for performance reasons). The BN development application also provides a simple way for the user to manually update beliefs in this case, again without resorting to modal user interface design.

FIG. 1 shows the composition of a BN development application that may, for example, be a software program executing on a computer work station or on other suitable hardware. The work station may have a user interface, such as a CRT or TFT monitor or other type of display to present information to a human user in textual or graphical form. The work station may additionally have one or more user input devices, such as a keyboard, mouse, tablet or other pointing device. The BN development application consists of both standard application components 112 and one or more views $114_1 \ldots 114_N$ of a BN.

The standard application components provide user interface elements such as a menu bar, tool bar, status bar, etc. that most contemporary desktop applications possess. The views of the BN are user interface components that create a display area on the user interface to present aspects of the BN to the user and allow the user to modify aspects of the BN. Each view may further include software that performs functions relating to constructing, modifying or using the BN that is executed in response to user interaction with the display area.

For example, one of the views $114_1 \ldots 114_N$ may be a network display. Such a view may be a software component that presents in a display area of the user interface a graphical representation of the BN and allows the user to input commands that specify changes in the topology of the BN. As another example, one of the views $114_1 \ldots 114_N$ may display a conditional probability table showing the contents of a selected discrete node's CPT and allow the user to provide input that edit those conditional probabilities.

Software components that customize components of an application are known. A conventional extensible programming environment, whether now known or hereafter developed, may be used to implement the BN development application. However, any suitable method of providing a customized user interface may be employed.

Figure 2:
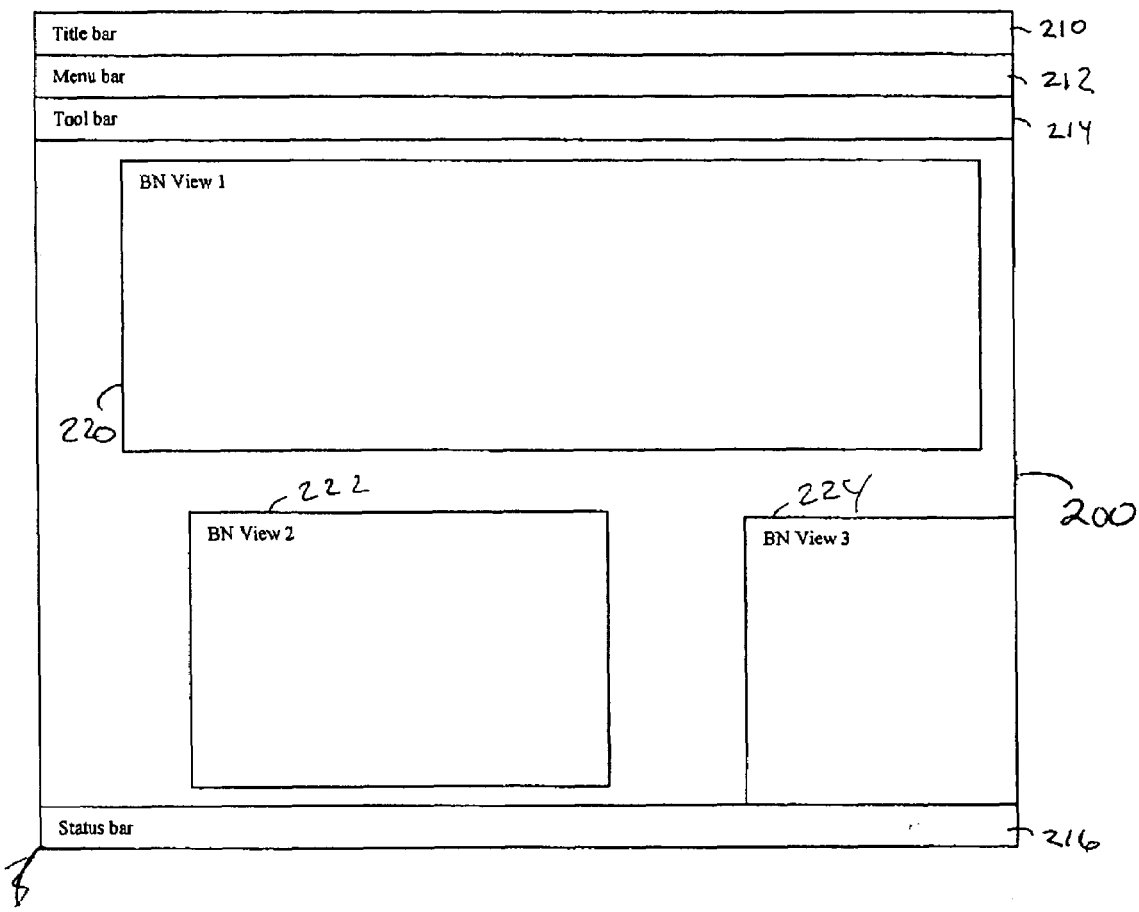
FIG. 2 is a sketch of a user interface for a modeless desk top application according to one embodiment of the invention.

FIG. 2 shows a user interface 200 of a generic desktop application containing standard application components and several BN displays. In the described embodiment, all of the BN displays are presented in a single application mode such that any functionality presented by any of the views may always be available to a user.

In the example of FIG. 2, user interface 200 includes standard user interface elements, such as a title bar 210, menu bar 212, tool bar 214 and status bar 216. Such elements are traditionally provided by standard application components of many program development systems. The standard elements provide a user interface, allowing a user access to commands or tools that are a portion of the standard application. When the standard user interface elements are presented in user interface 200, the tools or commands accessible through the standard user interface elements may be customized for the specific application. For example, menu bar 212 may display a "file" menu choice that allows a user to select an "open" command. While the open command may be a portion of a standard application component, it may be customized for the BN development application to present a user with only those files containing a representation of a Bayesian network that may be operated on by the BN development application.

User interface 200 also includes display areas 220, 222 and 224. Each of the display areas 220, 222 and 224 contains a user interface for a BN view component, such as views $114_1 \ldots 114_N$. A user may, for example, provide input or receive output from a view component by interacting with its corresponding display area. Traditional methods for interacting with a graphical user interface, such as pointing and clicking, typing text into a text box, selecting from a drop-down list or dragging a control icon may be used by a user to interact with each display area. However any suitable method of providing output to a user or receiving input from a user may be employed.

Because the application is, in the described embodiment, modeless, display areas for all BN views can be shown on the screen at the same time. The application may support multiple BN views of various types. The types of BN views include, but are not limited to, the following:

Network Views: displays the topology (i.e. nodes and edges) of the BN and receives user input to modify the data representing the topology of the BN. Each node shown in the display created by the Network View provides other information, such as the name and states of the node, evidence at the node, beliefs for the node, etc. The interface for each node may allow the user to input information that specifies or modifies this information. The interface for each node may contain one or more controls that allow the formation displayed to be expanded or collapsed to show only the desired amount of information.

Conditional Probability Distribution View: presents the CPD of a selected node and allows the user to modify the CPD. The specific contents of a display produced by this view will depend on the specific type of CPD of the node. For example, if the node has a CPT, then an appropriate table may be displayed and the user can modify the individual conditional probabilities both in numerical form (using, for example, a keyboard to enter text in an editable text field) and graphical form (using, for example, a mouse to drag and drop a control such as a slider). Or, if the node has a linear Gaussian CPD, then an appropriate table may be displayed and the user can modify the parameters of the CPD.

Node Properties View: shows the properties of a node and receives user input that specifies modifications to these properties. The properties of a node can include, but are not limited to, the node name, the states of the node, and the order in which the states appear.

Network Properties View: presents the properties of the BN and receives user input that specifies modifications to these properties. The properties of a BN can include, but are not limited to, the name of the BN, the appearance of the BN, and which modifications to the BN result in an automatic update of the beliefs.

Belief and Evidence Summary View: shows the evidence and beliefs of all nodes in the BN and allows the user to post, retract some, and retract all evidence.

Figure 3:
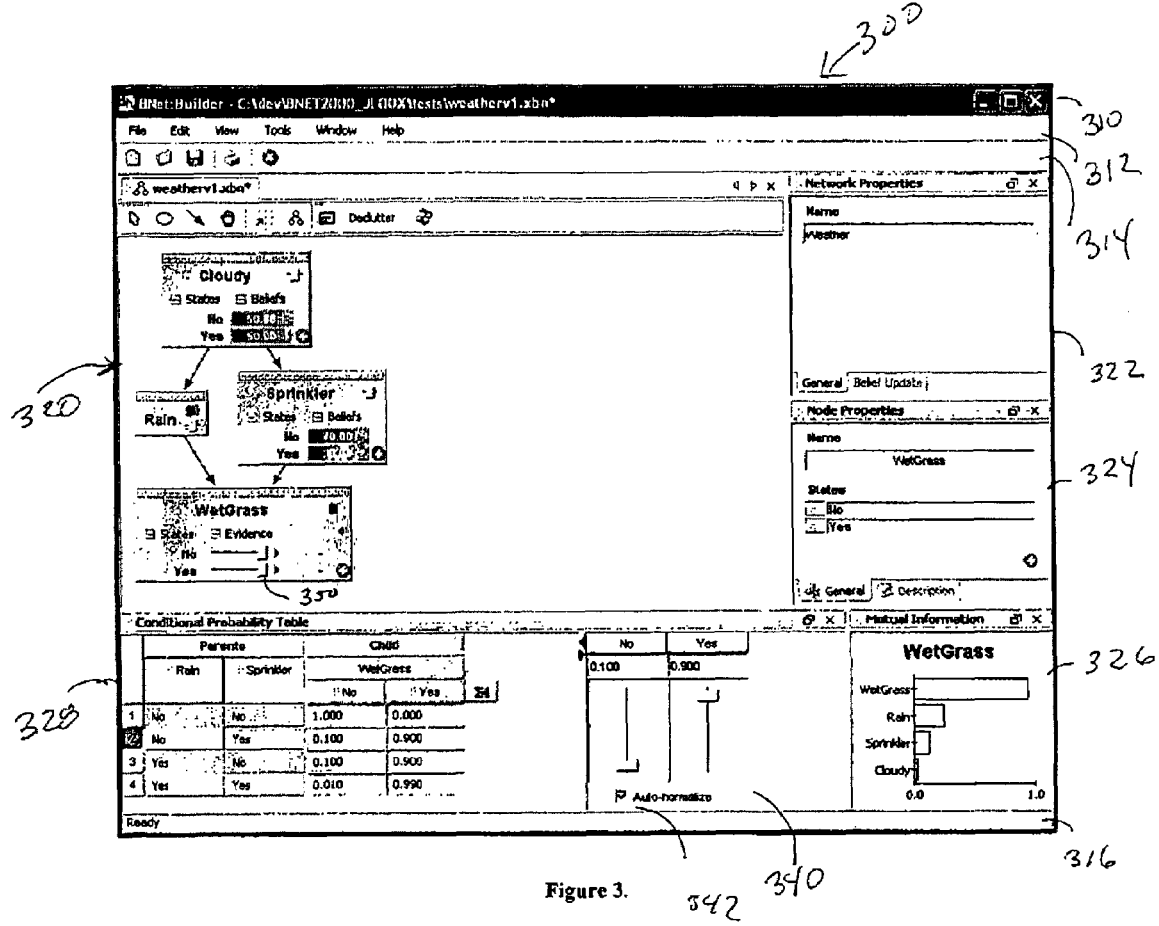
FIG. 3 is a sketch of a user interface for a BN development application according to one embodiment of the invention.

FIG. 3 shows one possible embodiment of a user interface 300 for developing and using BNs. In the pictured embodiment, the interface is modeless. User interface 300 includes a title bar 310, a menu bar 312, a tool bar 314 and a status bar 316. Title bar 310 may, for example, display the title of the application and name of the file being processed as is traditional in many applications using a graphical user interface. Likewise, menu bar 312, tool bar 314 and status bar 316 may be used as in a traditional application program using a graphical user interface. In the same way that title bar 310, through standard interfaces, is customized for the BN development application by displaying information about the application, entries in the other bars may likewise be customized. For example, the "tools" entry in menu bar 312 may provide access to a list of tools related to the BN development application. The "help" entry may provide access to a list of help topics related to the BN application.

User interface 300 may contain multiple display areas. Here, display areas 320, 322, 324, 326, 328 and 340 are shown. Each of the display areas provides a graphical user interface for a view and allows a user to input or receive information about the BN being processed by the BN development application. In the illustrated embodiment, all of the BN displays—showing information about elements of the BN, such as the graphical layout, properties of nodes, probability distributions, etc.—are displayed in a modeless fashion in the main application window. The user may access any of the displays to make modifications to the BN or view beliefs.

A modeless user interface can make all significant functionality of an application available to a user at one time. In a modeless interface for a BN development application, functionality to modify the BN and observe updated beliefs may be simultaneously available. In the embodiment of FIG. 3, display areas associated with all views may be visible to the user. However, it is not necessary that view areas for all displays actually appear simultaneously on the user interface. A modeless user interface can provide the option to allow the user to choose which display areas, and therefore which functionality, are currently available. The user can temporarily hide certain display areas and then show them again at a later time. This reduces clutter on limited-size computer monitors and only shows functionality and displays needed for the user's current task. The user can choose to close a display if the functionality provided by that display is not needed. The user can then later choose to open the display again to obtain access to the functionality provided by the display. This helps to reduce screen clutter when there are multiple BN displays open. Note that this does not violate the modeless property of the user interface: all of the BN displays can be displayed simultaneously. If the user does not want all displays simultaneously available, some displays can be closed. The user chooses the set of displays to view in the application, and thus the available set of functionality, as compared to a modal application where a set of displays and functionality are imposed on the user by the software.

A user interface can also provide the option to allow the user to reposition the displays on the screen. A display can be attached to one of the four sides of the main application window (known as docked) or can be positioned anywhere on the screen (known as floating). This allows the user to place a display where it looks the best and provides quick access to its functionality.

One specific type of modeless user interface that provides both of these options is known as a dockable frame user interface. In a dockable frame user interface, displays can be contained in dockable frames. The user can choose which displays are available, using a menu item to show the display and a close button on the display to hide it, and can position the displays anywhere on the screen by dragging them with the mouse. Dockable frame user interfaces are known in the art. User interface 200 may be a dockable frame user interface implemented with technology as now known or hereafter developed.

In general, any BN view may present any information about the BN to the user. The user can modify a part of the BN by changing the information in a display area associated with a view. In the described embodiment, the BN development application is programmed in an object oriented programming language and each of the views may be a programming object. In addition to presenting data to a user, each display may also perform subprograms or methods that take actions—such as storing data or making computations in response to user inputs or other events. Modifications that may be made to the BN include, but are not limited to, the following:

Add a node
Remove a node
Rename a node
Re-position a node
Change or edit a node's appearance, including its:
    Shape
    Size Outline color
Outline thickness
Background color
Label color
Label font
Label font size
Associated icon or image
Add an edge
Remove an edge
Re-position an edge
Disconnect and reconnect an edge
Change an edge's appearance
   Line color
   Line thickness
   Arrowhead shape
   Arrowhead direction
   Dash pattern
   Shape (e.g., straight, rectangular, Bezier, etc.)
Add a state to a node
Remove a state from a node
Reorder the states of a node
Rename one of the states of a node
Reorder the parents of a node
Post evidence to a node
Set the evidence for each state
Set the evidence for one state
Set the evidence for one state to be 1.0 and all other states to be 0.0 (i.e., post "hard" evidence)
Retract evidence from a node
Retract all evidence from the BN
Rename the BN
Change the appearance of the BN including:
   The appearance of all nodes in the BN
   The appearance of all edges in the BN
   The appearance of the background and surrounding area
Modify the layout of the BN
Modify the CPD of a node Each of the above modifications may be implemented, for example, by invoking a function or method associated with a view in response to a user input. The function or method may then alter data stored in computer memory representing an aspect of the belief network. Functions that modify stored data or either present or change the appearance of data presented to a user are known in the art and any suitable method for implementing these functions may be used.

The specific modifications that can be made to a node's CPD may be selected based on the specific type of CPD used for the node and thus are not listed exhaustively here. The BN development application may allow any desired modification relevant to the specific type of the node's CPD to be made, (e.g., a user may modify the type of the CPD, such as by specifying that the CPD should be a Gaussian distribution instead of a linear distribution, or may adjust the parameters of the particular distribution such as the mean value of the distribution).

Following are examples of CPDs that may be used. However, any suitable CPD may be used. For example, the multinomial distribution is typically used for discrete nodes with all discrete parent nodes and is represented by a conditional probability table (CPT). This table specifies $P(Child=c_i|Parents=parents_j)$, or the probability of each one of the child node's states $c_i$ given each specific configuration of the child node's parents' states $parents_j$. Thus, a modification to a CPT is a change to an individual probability of one of the node's states for a specific configuration of the node's parents' states. Such a change may be implemented, for each state, by changing the value stored at a location in a data structure in computer memory assigned to store the probability of that state.

The linear Gaussian distribution may be used for the CPD of a continuous node with continuous and/or discrete parent nodes. The CPD for continuous node X with discrete parent nodes D and continuous parent nodes C may have the form:

$$P(X \mid D = d_i, C = c) = N\left(\alpha_i + \sum_{j=1}^{n} \beta_i^j c_j, \sigma_i\right),$$

where $N(\mu, \sigma)$ represents the Gaussian distribution with mean $\mu$ and variance $\sigma$, and $d_i$ represents the i-th configuration of discrete parents D. When there are n continuous parent nodes and m configurations of states of discrete parent nodes, there are:

m $\alpha_i$ parameters
m*n $\beta_i^j$ parameters
m $\sigma_i$ parameters needed to specify the CPD for continuous node X. Thus, a modification to a linear Gaussian CPD is a change in any of the $\alpha_i$, $\beta_i^j$, or $\sigma_i$ parameters. Such a change may likewise be implemented by changing the value stored at a location in a data structure in computer memory assigned to store the specific parameter or in any other suitable way.

As another example, the probit and logit distributions can both be used for the CPD of a discrete node with continuous parent nodes. Both of these distributions specify a "soft" threshold function, where the discrete child node takes on different discrete states given continuously varying values of its continuous parent nodes. Each of these CPDs has an associated set of parameters that can be modified. The CPDs may be modified as described in published literature such as Bishop, C. (1995), *Neural Networks for Pattern Recognition*, Oxford, UK: Oxford University Press; Daganzo, C. (1979), *Multinomial probit: The theory and its applications to demand forecasting*, New York: Academic Press; and Cobb, B. R. & Shenoy, P. P. (2005, in press), Inference in Hybrid Bayesian Networks With Mixtures of Truncated Exponentials, *International Journal of Approximate Reasoning*; which are hereby incorporated by reference.

The described embodiment also includes a mechanism by which information entered by a user through a display area associated with one view can be shared with other views. Preferably, the sharing mechanism is dynamic, meaning that information is communicated as it is input or changed without direct user intervention.

Figure 4:
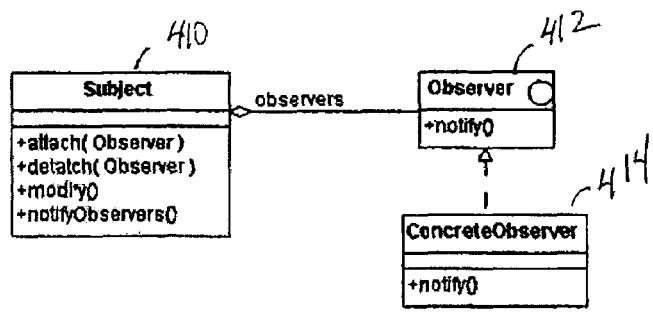
FIG. 4 is a block diagram illustrating an observer design pattern used to implement a BN development application according to one embodiment of the invention.

Because the BN may be modified through any of the display areas, a system may be provided to notify each of the views when the model of the BN is modified. This can be accomplished using the Observer design pattern as described in Gamma, E., Helm, R., Johnson, R., & Vlissides, J. (1995), Design Patterns: *Elements of Reusable Object-Oriented Software*, Reading, Mass.: Addison-Wesley, which is hereby incorporated by reference. An example of the observer design pattern is shown in FIG. 4 as a class diagram, and FIG. 5 as a sequence diagram. This design pattern consists of three entities: a Subject 410, Observer 412, and Concrete Observer 414. Subject 410 may be any entity that may change. Observer 412 is an abstract entity that is notified of modifications to the Subject. Any entity can be an Observer—a specific entity that is an Observer is called a ConcreteObserver. Subject 410 maintains a list of concreteObservers and notifies the concreteObservers when it is modified. The ConcreteObserver can then take appropriate action based on the notification.

The views $114_1 \ldots 114_N$ are examples of Concrete Observers and the model of the BN they display is an example of a subject and is thus observable The model notifies the views when it has been modified, and the views update as necessary in response to the notification.

The BN may, for example, be an instance of a class in the Java programming language. FIG. 4 shows such a class as subject class 410. In addition to definitions of variables that store information characterizing the BN, such a class may include methods for operating on the objects within the class. Using the terminology illustrated in FIG. 4, such methods would be "modify" type methods. In addition, subject class 410 may include methods to attach or detach concrete observers. Such methods, when operated, cause an object of subject class 410 to add or remove a concrete observer 414 from a list of observers. When implemented as an instance of subject class 410, the BN would also include a method to notify all the attached observers. Such a method may, for example, be invoked as part of every method of the modify type. When invoked, the method to notify observers may call a method defined in the observer class 412.

ConcreteObservers 414 may be instances of observer class 412. Observer class 412 may include methods that could be called to notify each concrete observer attached by the BN that a change to the BN has occurred and trigger an update to calculated or displayed information.

When the notify method is invoked in a view that is a concrete observer 414, appropriate updates to the displays generated by that view may be performed. The specific action is taken in each concrete observer 414.

Figure 5:
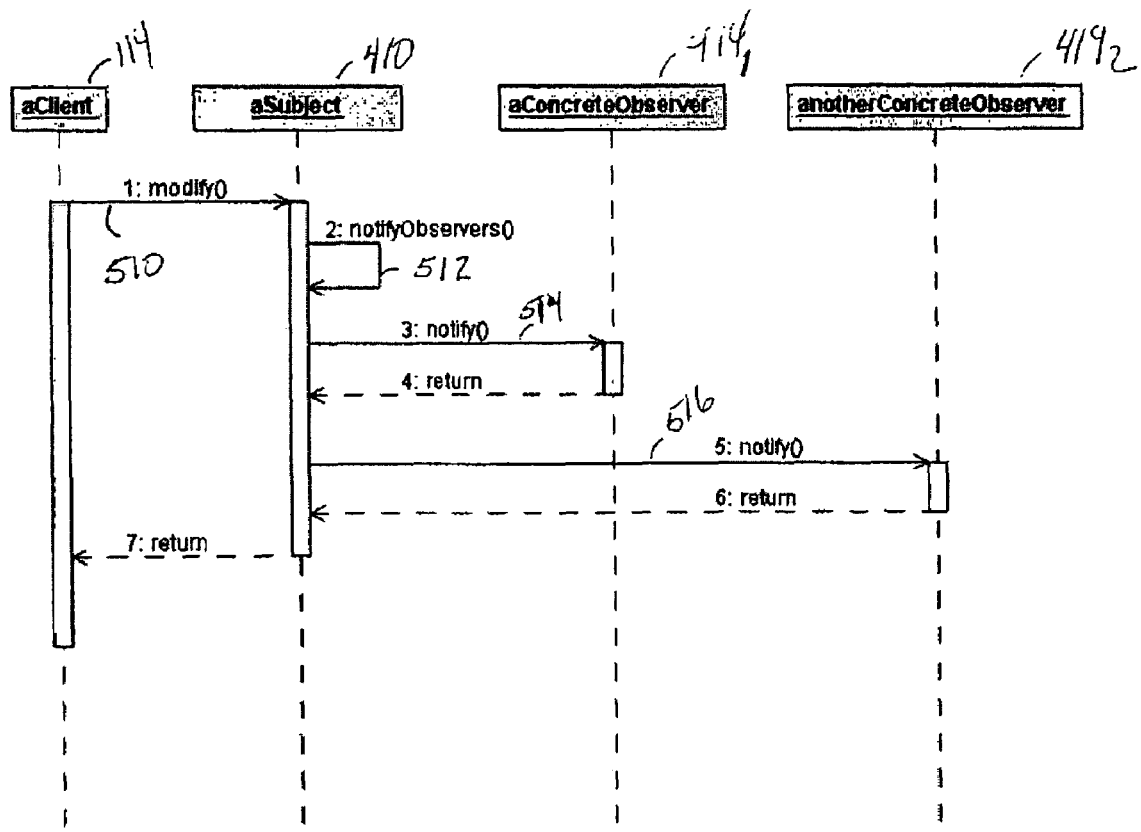
FIG. 5 is a sketch illustrating the interaction of components according to an embodiment of the observer design pattern of FIG. 4.

FIG. 5 shows a sequence diagram of the notification of the concrete observers. A client of the subject may modify the subject. In this instance, the client may be one of the views $114_1 \ldots 114_N$ and the subject 410 may be the program object containing a representation of the BN. Modification may be the result of a call to modify a type method defined in subject class 410. Modification is illustrated by step 510.

At process step 512, a method "notifyObservers ( )" within subject 410 is called. Because the subject 410 contains a list of all concrete observers attached to subject 410, step 512 allows each concrete observer to be notified of the modifications to subject 410. At process step 514, the first concrete observer $414_1$ is notified. At process step 516, the next concrete observer $414_2$ is notified. Each concrete observer may be notified in turn until all concrete observers attach to subject 410 have been notified.

An alternative method to using the Observer design pattern would be for each display to poll the BN continuously to see if it has been modified and re-display itself if the BN has been modified. Though, any suitable method cause modules to execute as appropriate in response to inputs may be used.

The described embodiment also includes a method for automatically updating the beliefs when any modification is made to the BN. As described in the Background section, the Inference Engine uses the CPDs of the BN and the current evidence to calculate beliefs. Thus, beliefs can be updated when any modification is made to the BN that affects the CPDs or the evidence.

In some embodiments, the BN development application may include a control that the user can set to preclude automatic updating of beliefs. But, if automatic updating is not disabled, the beliefs may be updated automatically when any modification is made to the BN, with no required action by the user.

Any number of BN displays can present beliefs to the user, and all BN displays may be notified when beliefs are updated so that each can show all or a subset of the current beliefs to the user.

In other embodiments, the BN development application may provide controls that allow the user to selectively enable or disable automatic belief updating for each individual type of modification. Other controls may cause beliefs to be updated.

Figure 6:
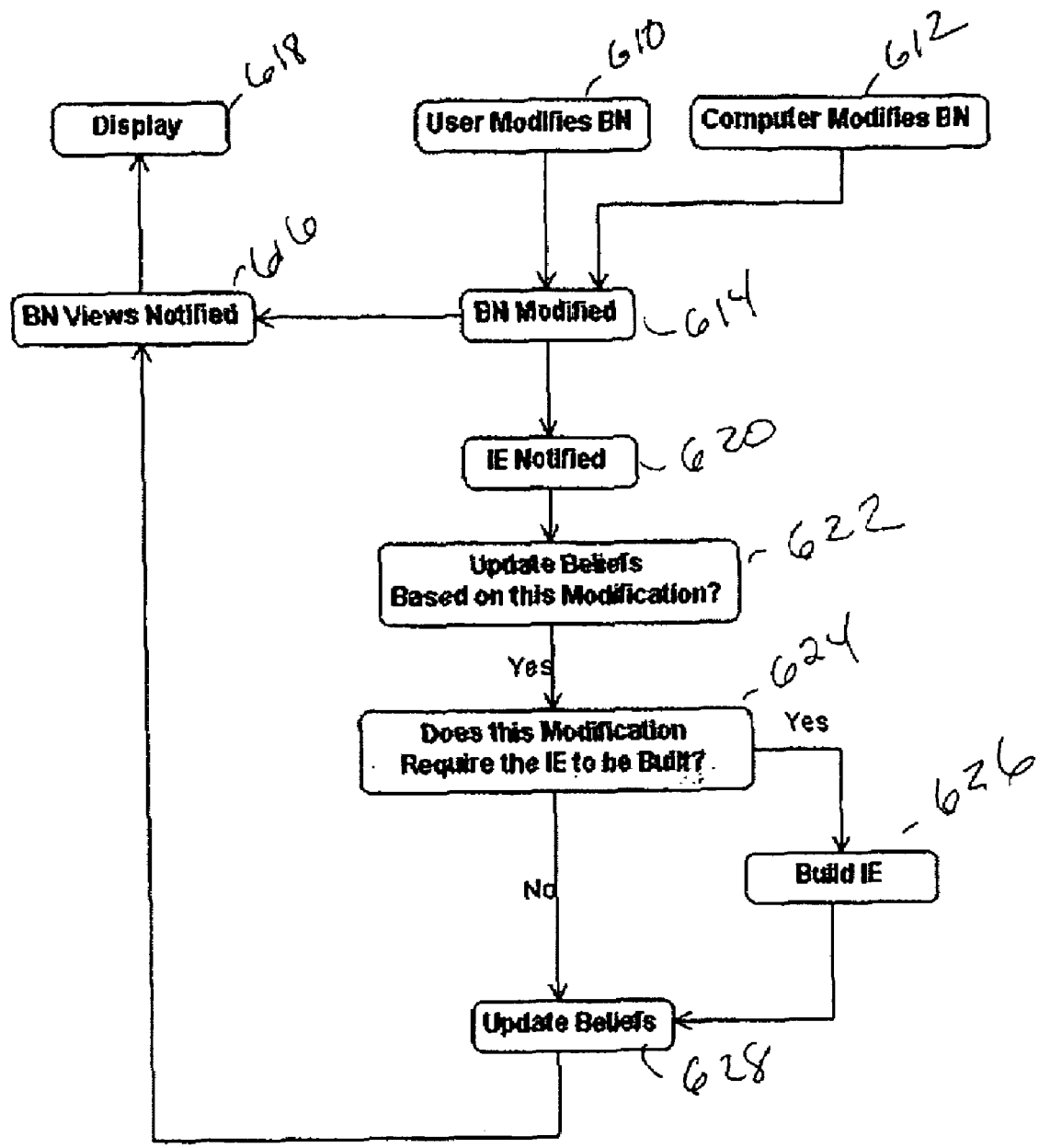
FIG. 6 is a flow chart of a process for automatic belief updated according to one embodiment of the invention.

FIG. 6 is a flowchart demonstrating a process by which modifications to the BN may result in updated displays and updated beliefs. FIG. 6 shows how the BN can be modified either by the user through the BN displays and associated user interfaces or by other applications executing on a computer that interfaces with the computer on which the BN application executes. After the BN is modified, the BN views are notified of modifications to the BN and then updated displays are presented to the user. Such a process allows the BN displays created by the views to always show the current state of the BN in the modeless user interface.

In the process of FIG. 6 an input to the BN application specifying a modification to an aspect of the BN results in a real time change in the display produced by the BN applications such a process may be performed when automatic belief updating is enabled. The process may begin at step 610 or 612 where an input specifying a modification to the BN is provided. The input may be provided at step 610 from a user interacting with the BN development application using an input interface device, such as a mouse. Alternatively, the input may be provided at step 612 from an application running on a computer. The computer may be the same computer running the BN development application or any other computer connected to it. The application may be, for example, a financial modeling program or a control system that uses the BN application to predict beliefs that are incorporated into decision making algorithms within the application.

Regardless of the specific source of the input, the input specifies a characteristic of the BN being operated on by the BN development application. In an embodiment described above, the BN is represented by data stored in a computer-readable media in a format established by a class developed in the Java® programming language. Such a class may include methods that may be invoked to change the information stored in connection with the model of the BN as illustrated by subject class 410 (FIG. 4). Changes may impact such aspects of the BN as the number of nodes, the interconnection between nodes or the conditional probability distributions associated with a particular node.

Regardless of which aspect of the BN is modified at step 614, subsequent processing updates the information displayed by the BN development application for a user. The modification may directly impact information displayed. For example, when the evidence associated with a particular state is modified, any of the views $114_1 \ldots 114_N$ using that evidence as an input may alter the information displayed for the user. This possibility is reflected by the direct connection between step 614 and step 616. Each of the views $114_1 \ldots 114_N$ may be constructed to produce a display for the user based on the current data stored as a representation of the BN. Thus as inputs modify the information stored representing the BN, each of the views $114_1 \ldots 114_N$ may refresh its display using the modified information.

Some modifications to the BN can be reflected by simply refreshing the displays produced by views $114_1 \ldots 114_N$. However, other modification may result in the need to update the computed beliefs. This possibility is reflected by the connection from step 614 to step 620. At step 620, the software component implementing the inference engine used in the BN application is notified. Notification may be according to the Observer design model illustrated in FIG. 4.

At step 622, a decision is made whether the inputs provided at step 610 or 612 have specified a modification to the BN that may alter the beliefs computed using the BN. If no such alteration results from the inputs, further processing is not required. When the modifications require an update of beliefs, processing proceeds to step 624.

Many types of modifications may result in the need to recompute the beliefs. Because the inputs to the inference engine are the CPD of each node in the BN and all available evidence, any modification that changes any CPD in the BN or any evidence may result in the need to recompute the beliefs. These changes may be made on one or more ways and may include, for example, a direct modification to a parameter of a CPD, as described above for several types of CPD (which are examples only and the invention is not limited to just those types of CPD). Beliefs may be recomputed in response to a change in the available evidence, whether that is change is the result of obtaining evidence for a node in which no previous evidence was available for that node, changing the evidence available for a node, or eliminating evidence previously available for a node. Changes triggering a re-computation of the beliefs may also include other modifications that affect one or more CPDs of nodes in the BN. For example, adding a new node to the BN creates a new CPD for that node, and thus beliefs may be calculated for the new node. In another example, adding a new edge from a parent node to a child node adds new parameters to the child node's CPD, depending on the type of parent and child nodes and the type of the child node's CPD. In yet another example, removing a state from a discrete node changes that node's CPD along with all of its children's CPDs. In one embodiment, any modification made to a BN, including but not limited to the list provided above, that changes the CPD or evidence of any node in the BN results in the recalculation of the beliefs.

At step 624, a decision is made as to whether the modification specified by the input received at step 610 or 612 requires that the inference engine used to compute beliefs be modified. Some types of modifications to the BN will not impact the structure of the inference engine used to compute beliefs with the BN. For example, the modified beliefs may be computed with the same inference engine when only evidence has changed. In such a scenario, the process may continue to step 628 where the modified beliefs are computed with a previously constructed inference engine.

Alternatively, some modifications to the BN require that an inference engine used to compute beliefs for the BN be updated. This possibility is reflected by the connection between step 624 and 626. When the BN is modified, the IE is notified of the modification (the IE is an Observer of the BN, just like each BN display is an Observer of the BN). In an embodiment in which a user may specify whether automatic updating is to occur, if the user has enabled belief updating for the modification, the IE then decides if it needs to be rebuilt.

At step 626, the inference engine is built using the modified information concerning the BN. As described in the Background section, the IE must be built if the modification affected the structure of the BN, such as by changing any CPD in the BN or by changing interconnections of nodes in the BN. After the IE is optionally re-built, the beliefs are re-calculated and the BN displays are notified of the change so that they reflect the updated beliefs. The IE may be built or rebuilt using processes as traditionally used or according to any other suitable process, whether now known or hereafter developed.

The process then continues to step 628 where the modified inference engine is used for updating beliefs. When the IE is notified of the modification to the BN, it can perform the belief update computations in a number of ways, including, but not limited to: in the same thread that the notification occurred on, in a separate thread, in multiple threads, by multiple processors of the same computer, or distributed across the processors of multiple computers. When the IE performs the belief update computations in the same thread as the modification notifications, the user interface may appear temporarily unresponsive to the user. Thus, it may be desirable to perform the computations in separate threads (in the background) from the modification notification thread to improve the responsiveness of the user interface. Also, because the belief update computations can be very complex and time consuming, taking advantage of multiple processors or multiple computers may also improve the responsiveness of the user interface.

At step 616, notification of the modified beliefs may be provided to each of the views $114_1 \ldots 114_N$. Notification may be provided using the observer design model as described above or any other suitable mechanism.

In response to receiving notification that a belief has been modified, each of the views relying on any of the modified beliefs may redraw its display at step 618 such that the display presented to the user may reflect the modification specified by inputs provided at step 610 or 612.

The automatic belief updating functionality pictured in FIG. 6 is possible because the application uses a modeless user interface. The user can make any modification to the BN at any time without having to switch modes. After making any modification to the BN, the beliefs are updated automatically and displayed to the user without the user having to switch modes or perform any additional action. The user performs the modification and can then view the updated beliefs immediately. This process helps the user to understand how different modifications to a BN affect the beliefs and aids the user in iteratively developing a BN. Features may be incorporated into a BN development application as an aid to iterative development.

Information may be input to the BN in any suitable way. For example, when conditional probability table (CPT) is used to represent the CPD of a node, graphical sliders can be used to allow the user to modify the probabilities by dragging the sliders. Because the modeless user interface allows the probabilities to be modified and the beliefs to be viewed at the same time and because beliefs are updated automatically when modifications are made to the BN, as the user drags the sliders to modify the probabilities, the user can view the beliefs being updated. Thus, the user can view the effect on the beliefs of the modifications to the probabilities. Sliders 340 can be seen in FIG. 3 in a display produced by the Conditional Probability Table view.

A further feature of the graphical user interface of FIG. 3 is that the sliders include an auto-normalize option. In the embodiment of FIG. 3, check box 342 is a control that allows a user to specify that auto normalize should be used. Because the sum of the conditional probabilities for a particular state should be 1.0, any change in one conditional probability requires offsetting changes in all the others. The view providing the slider display includes a method that computes the required changes to the other conditional probabilities whenever one of the conditional probabilities is changed.

Graphical slides may be used to receive other types of user inputs. For example, graphical sliders 350 can be used to allow the user to modify the evidence on each node. Because the modeless user interface allows the evidence to be modified and the beliefs to be viewed at the same time and because beliefs are updated automatically when modifications are made to the BN, as the user provides input by dragging the sliders to modify the evidence, the user can observe the beliefs being updated. Thus, the user can observe the effect on the beliefs from modifications to the evidence.

Figure 7:
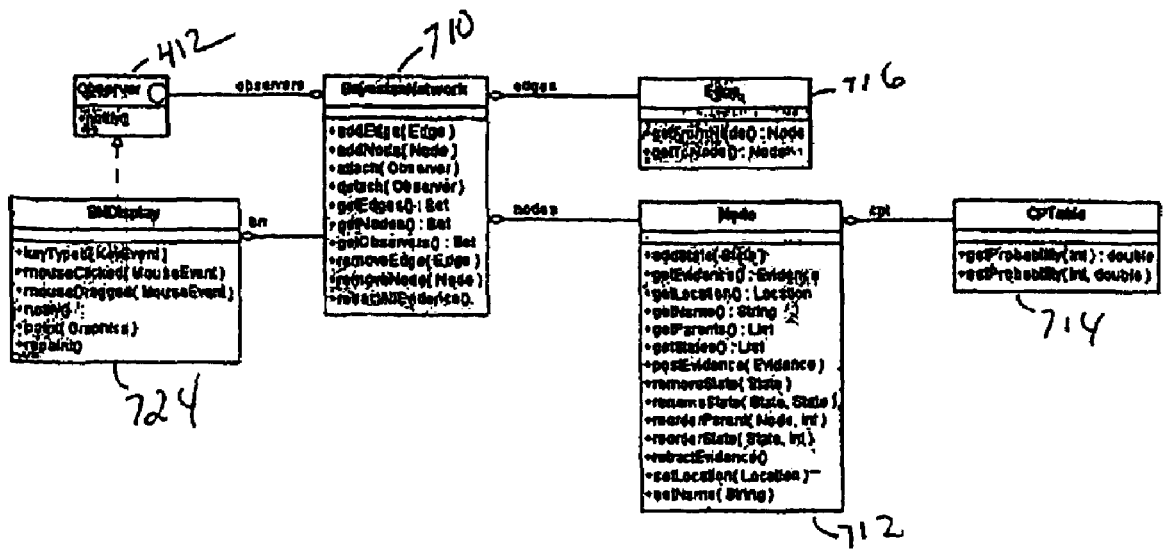
FIG. 7 is a class diagram for software implementing a portion of the BN display application according to one embodiment of the invention.

A BN development application as described above may be constructed in any suitable way. For example, embodiments may be constructed within the commercial software application BNet.Builder. That application is implemented in the object-oriented programming language Java. FIG. 7 shows a class diagram for the Bayesian network and BNDisplay data structures that may be used in one embodiment of the BN development application. A BayesianNetwork class 716 is used to instantiate an object that represents the BN; a Node class 712 is used to instantiate an object that represents a node in the BN, an Edge class 716 is used to instantiate an object that represents an edge in the BN; a CPTable class 714 is used to instantiate an object that represents a CPT for a node; and BNDisplay class 724 may be used to instantiate one or more views. In operation, objects of these classes are instantiated, with each object inheriting the methods and properties of the class from which it is created.

Accordingly, each node is represented by an object of node class 712 that includes methods that may operate on the node. For example, the method "add state" may be used to modify the BN by adding a state to a particular node. A method "post evidence" may be used in a similar fashion to change evidence associated with a particular node. Other methods are provided for the converse operations such as "retract evidence" and "remove state." Yet other methods implement the functions used in the observer design model as discussed above in connection with FIG. 4.

A BayesianNetwork object may reference multiple Node and Edge objects, and each Node object may reference a CPTable object. An object created using the BayesianNetwork class 710 has methods such as "add edge" or "add node" that allow edges or nodes to be added to the Bayesian Network being processed by the BN application. Other methods allow the converse operations to be performed such as the methods "remove edge" or "remove node." Each of these methods when invoked, alters information stored in memory representing the structure of the BayesianNetwork. The use of methods in classes as pictured in FIG. 7 abstracts the specific representation of data used to store the structure of the BayesianNetwork. Any suitable data storage scheme may be used to represent the BayesianNetwork.

FIG. 7 also indicates an observer class 412. As described above in connection with FIG. 4, a list of objects acting as observers of the BayesianNetwork is maintained. Objects are attached or detached as the BN application operates. The objects created from BN display class 724 serve as the concrete observers 414 (FIG. 4) and may inherit the methods and properties of observer class 412. In operation, each modification to the object of BayesianNetwork class 710 causes a notification to every object that is attached as an observer.

Class 724 is used to instantiate each BN view. Each object instantiated for BNDisplay class 724 references an object of BayesianNetwork class 710. Each object of BNDisplay class 724 draws information to the computer screen to present information about the BayesianNetwork object to the user and also accepts input such as from a mouse or keyboard input from the user to modify the BayesianNetwork object. When an object of BNDisplay class 724 receives input, it can modify the BN in some way by calling one of the methods of the BN, such as may be defined in a BayesianNetwork class 710.

Each view of BN display class 724 is also an observer of the BN of BayesianNetwork class 710. When notified of a modification to the BayesianNetwork object, the BN view re-draw their displays on the computer monitor to reflect the current state of the BayesianNetwork object.

To determine the object within a view to which user input relates, a selection model may be used. The selection model indicates which view and/or object within a view is currently selected, and therefore which object receives any user input.

In one embodiment, the selection model stores all elements of the BN that are currently selected and is shared by all BN views. Elements of a BN that may be selected by a user include any element on a display associated with a view of a node of BN. When the user selects an element of the BN in a display associated with one view, all other views are notified of the selection. Each view can then update based on the new selection. For example, when the user selects a node in the Network View, that node also becomes selected in the Belief and Evidence Summary Views and that node's CPD is presented to the user in the Conditional Probability Distribution View. Various inputs or commands may have a result linked to the specific element selected at the time the input is supplied.

Any view can allow the user to select any element of the BN, and because the selection model is shared by all displays, all of the displays are notified of the change in selection. The shared selection model would not be possible in a modal user interface, because the user may not be able to select certain elements of the BN and certain displays may not be shown to the user, depending on the current mode.

Some BN display objects also reference a BnetSelectionModel object and observe it for selection changes. When notified of a selection changes, the BN display object re-draws itself to the computer monitor to reflect the current selection state.

Figure 8:
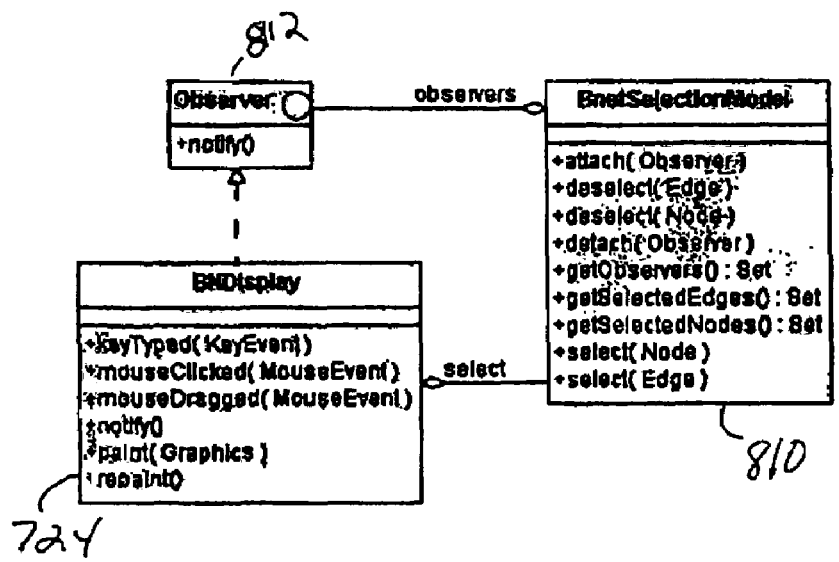
FIG. 8 is a class diagram for software implementing a further portion of the BN display application according to one embodiment of the invention.

All objects in the BN application may also have access to information about which items have been selected by a user. An object of BnetSelectionModel class 810 represents the shared selection model and its class diagram is shown in FIG. 8. An object of the BnetSelectionModel class may reference multiple Node and Edge objects that are currently selected by a user interacting with the development application through a mouse or other suitable user interface. BnetSelectionModel class 810 provides a method for objects acting as clients to register with it to receive selection events when the current selection changes. In the same way that an object of observer class 412 may notify objects of changes in the BN, an observer 812 may be used to notify each object attached to an object initiated for the BnetSelectionModel class that a user selection has changed.

Figure 9:
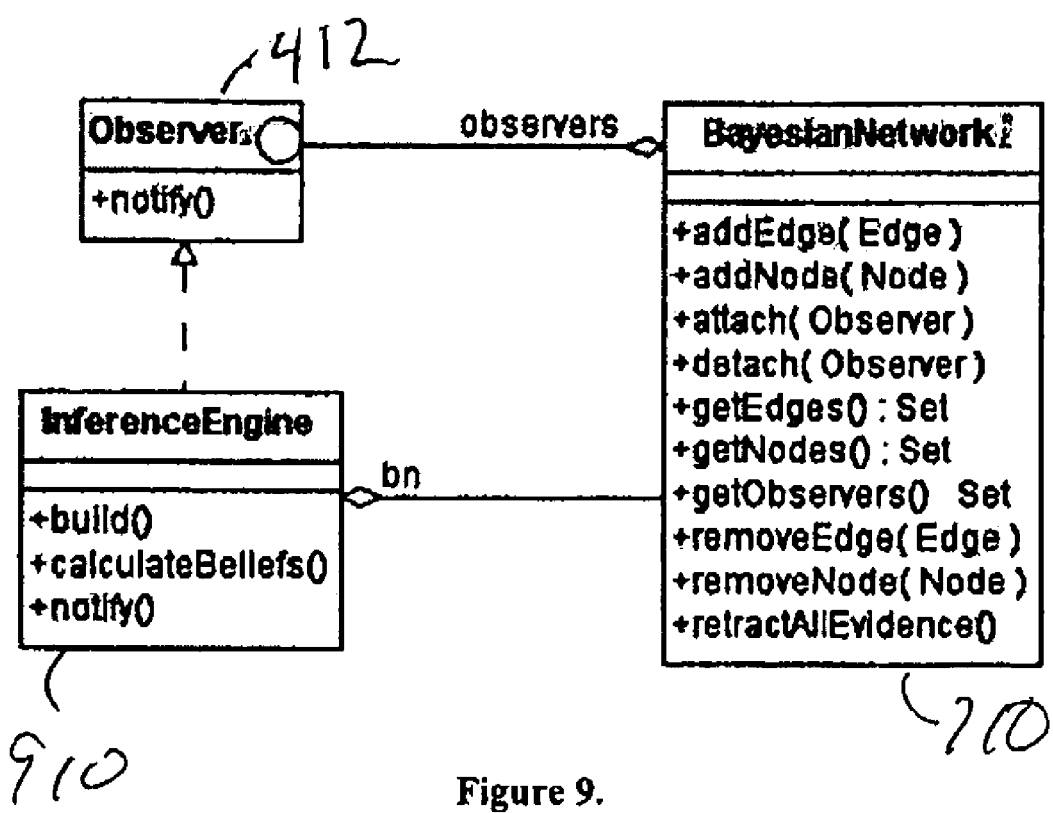
FIG. 9 is a class diagram for software implementing the inference engine of a BN display application according to one embodiment of the invention.

FIG. 9 shows the class diagram for the Inference Engine, which may also be implemented in the Java programming language. The InferenceEngine references BayesianNetwork class 710. An object instantiated for InferenceEngine class 910 contains methods that calculate beliefs for the BayesianNetwork.

The BayesianNetwork object may notify the InferenceEngine when it has been modified. The InferenceEngine may then rebuild itself, if necessary, based on the modification that occurred. The inference engine may be built or rebuilt using techniques as known in the art. The inference engine may then recalculate beliefs if the user configured it to do so for the modification that occurred. When the beliefs have been recalculated, the InferenceEngine notifies all of the BayesianNetwork's Observers of the updated beliefs using the observer design pattern shown in connection with FIG. 4.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of embodiments of the invention.

For example, while the foregoing description applies to GUIs for computer systems such as personal computers (PCs), the present invention is not limited to use with PCs as it could be implemented on minicomputers, mainframes, embedded systems, or any other data processing equipment that has the ability to present graphical information to the user.

Also, the automatic belief updating can be used by a system without a GUI, where modifications are made to the BN through some other interface mechanism. In this case, the modification is made, and then beliefs are automatically updated and can then be used by the system in some way without the system explicitly requesting the beliefs to be updated.

As a further example, some embodiments were illustrated by discrete nodes in which the node has a finite number of states and a probability associated with each state. The invention is a not limited to use only with discrete nodes. The invention may, for example, be employed in connection with continuous nodes that can take on any states in a range. It is therefore contemplated that such modifications can be made without departing from the spirit or scope of the present invention as defined in the appended claims.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A data analysis and modeling system, comprising:
a processing system configured to:
    a) receive a plurality of inputs representing evidence and information indicative of a structure of a belief network;
    b) provide at least one output representative of at least one belief based on the plurality of inputs; and
    c) automatically update the at least one output representative of at least one belief in response to at least one of the plurality of inputs having a value representative of a change to the evidence or the information indicative of the structure of the belief network.

2. The data analysis and modeling system of claim 1, wherein the processing system is further configured to model the belief network as a plurality of interconnected nodes and wherein the information indicative of a structure comprises information indicative of interconnections between the nodes and at least one conditional probability distribution associated with a node.

3. The data analysis and modeling system of claim 2, wherein the processing system is further configured to automatically update in response to an input representative of a change in the at least one conditional probability distribution.

4. The data analysis and modeling system of claim 2, wherein the processing system is further configured to automatically update in response to one of the plurality of inputs representing a change in the evidence.

5. The data analysis and modeling system of claim 1, wherein the processing system is further configured to:
selectively place, prior to automatically updating the output, the belief network development application in an operating state in which the outputs are automatically updated in response to an input representative of a change to the evidence or the information indicative of the structure of the belief network.

6. The data analysis and modeling system of claim 1, wherein the processing system is further configured to automatically update the output representative of at least one belief in response to one of the plurality of inputs representing a change within only a predetermined subset of inputs.

7. The data analysis and modeling system of claim 6, wherein the processing system is further configured to automatically update the output representative of at least one belief in response to one of the plurality of inputs representing a change in evidence or a change in a conditional probability distribution.

8. The data analysis and modeling system of claim 6, wherein the processing system is further configured to:
receive an input from a human user representative of the predetermined subset of inputs.

9. The data analysis and modeling system of claim 1, wherein further comprising a data generating subsystem coupled to the processing system, and wherein the processing system is further configured to:
receive one of the plurality of inputs having a value representative of a change from the data generating subsystem.

10. A computer-readable medium having stored therein computer-readable instructions for a processor, wherein said instructions when executed by said processor cause said processor to:
receive information representative of a Bayesian network
detect received information representative of a modification of the Bayesian network; and
build an inference engine for computing beliefs based on the Bayesian network in response to the detected modification of the Bayesian network.

11. The computer-readable medium of claim 10, wherein the Bayesian network is modeled as a plurality of interconnected nodes, and wherein the instructions further cause information to be detected that represents a change to the model of the interconnected nodes.

12. The computer-readable medium of claim 10, wherein the Bayesian network is modeled as a plurality of interconnected nodes, each of which has a parameter associated therewith with information representing a conditional probability distribution of values of the parameter and wherein the instructions further cause the processor to detect information that represents a change to the information representing the conditional probability distribution.

13. The computer-readable medium of claim 10, wherein the Bayesian network is modeled as a plurality of interconnected nodes, each of which has a parameter associated therewith with information representing evidence that the parameter has a value and wherein the instructions further cause the processor to receive information that is representative of a change in the evidence of a parameter of at least one of the plurality of interconnected nodes.

14. The computer-readable medium of claim 10, wherein the instructions further cause the processor to build the inference engine only when the detected modification is within a portion of the Bayesian network.

15. The computer-readable medium of claim 14, wherein the instructions additionally cause the processor to receive a user specification of the portion of the Bayesian network.

16. The computer-readable medium of claim 10 wherein the instructions further cause the processor to display information about the Bayesian network which can automatically update in response to receipt of information representative of a Bayesian network.

17. A computer system, comprising:
a) a graphical user interface including a display and a user input device,
wherein the display is configured to simultaneously:
display in a first viewing area information reflecting a construction of a belief network; and
display in a second viewing area information reflecting a belief derived from a computation using the belief network; and
wherein the user input device is configured to receive user input based on an interaction with the first viewing area, the user input specifying a modification of the construction of the belief network; and
b) a processor configured to automatically compute information reflecting a modified belief derived from a computation using the belief network as modified according to the user input;
wherein the display is further configured to automatically display in the second viewing area information reflecting the modified belief.

18. The computer system of claim 17, wherein the display is further configured to:
simultaneously display in a third viewing area information reflecting evidence used by the processor to automatically compute the information reflecting the modified belief.

19. The computer system of claim 18, wherein the display is further configured to:
simultaneously display in a third viewing area information reflecting a construction of the Bayesian network, including nodes, interconnections among the nodes and conditional probability distributions for parameters associated with the nodes.

20. The computer system of claim 19, wherein the graphical user interface comprises a modeless user interface that includes user controls for providing the user input without switching modes.

21. The computer system of claim 18, wherein the first viewing area, the second viewing area and the third viewing area provide a modeless user interface for a belief network development application.

22. The computer system of claim 17, wherein each of the first viewing area and the second viewing areas has a control associated with it, and wherein the computer system is further configured to:
a) receive a control input from the user actuating the control associated with the first viewing area or the second viewing area; and
b) in response to receiving the control input from the user, hide the viewing area associated with the actuated control.

23. The computer system of claim 17, wherein each of the first viewing area and the second viewing area has a control associated with it, and wherein the computer system is further configured to:
a) receive a control input from the user actuating the control associated with the first viewing area or the second viewing area;
b) in response to receiving the control input from the user, hide a portion of the information in the viewing area associated with the actuated control.

24. The computer system of claim 17, wherein the user input device is additionally configured to:
a) receive a user input specifying a fixed location of the first viewing area and displaying the first viewing area in the fixed location; and
b) receive user input specifying a floating location of the second viewing area and displaying the second viewing area in the floating location.

25. The computer system of claim 17, wherein the first viewing area comprises a slider control for receiving input concerning evidence that a parameter has a value, and wherein the user input device is additionally configured to:
a) receive an input through the slider control and automatically display in the second viewing area a belief derived from the input received through the slider control.

26. The computer system of claim 25, wherein the computer system is further configured to implement a Bayesian network development application and wherein the display is configured to display the belief derived from the input received through the slider control without switching operating modes of the Bayesian network development application.

27. The computer system of claim 17, wherein:
the belief network is modeled as a plurality of nodes, each having a parameter with a conditional probability distribution associated therewith;
and the user input device is further configured to receive user input specifying a change in the type of a conditional probability distribution of a node.

28. The computer system of claim 17, wherein the processor is configured to automatically compute with an inference engine.

29. The computer system of claim 17, wherein the user interface further comprises a control and the processor is additionally configured to:
a) compute information reflecting a belief in response to user acutation of the control.

30. The computer system of claim 17, wherein the user input device and display are configured to receive user input and automatically display in the second viewing area information reflecting the modified belief in the same user interface mode.

* * * * *